United States Patent [19]

Greer

[11] 4,405,542

[45] Sep. 20, 1983

[54] METHOD FOR THE PRODUCTION OF A COMPOSITE MATERIAL

[76] Inventor: Marian B. Greer, RR #1, Box 74, Coulterville, Ill. 62237

[21] Appl. No.: 342,609

[22] Filed: Jan. 25, 1982

[51] Int. Cl.³ .............................................. B29J 5/00
[52] U.S. Cl. ..................................... 264/109; 264/122
[58] Field of Search ................................ 264/109, 122

[56] References Cited

U.S. PATENT DOCUMENTS

| | | | |
|---|---|---|---|
| 3,050,777 | 8/1962 | Siempelkamp . | |
| 3,428,585 | 2/1969 | Schuller | 260/17.3 |
| 3,482,675 | 12/1969 | Hutz | 198/102 |
| 3,565,725 | 2/1971 | Siempelkamp | 156/375 |
| 3,892,619 | 7/1975 | Hutz | 156/382 |
| 3,895,984 | 7/1975 | Cone et al. | 156/79 |

*Primary Examiner*—James R. Hall
*Attorney, Agent, or Firm*—Woodard, Weikart, Emhardt & Naughton

[57] ABSTRACT

A method for the production of a composite material formed from comminuted particles including blending the particles and a suitable adhesive, forming the blend into a mat, and compressing the mass by at most about 65 percent. In related aspects, the particles have a defined diversity of thicknesses, adhesive is used in an amount less than about six percent by weight, and the material is compressed to have a void volume of at least about 10 percent.

19 Claims, No Drawings

METHOD FOR THE PRODUCTION OF A COMPOSITE MATERIAL

BACKGROUND OF THE INVENTION

1. Field of the Invention

The present invention relates to methods for the production of composite rigid material, and particularly to the forming of a rigid material from comminuted wood particles of various shapes.

2. Description of the Prior Art

The manufacture of composite rigid materials from comminuted particles, including wood chips or smaller particles, has been known for some time in the prior art. Particleboard production has grown rapidly in the last 20 years and exceeded 45 million cubic meters in 1977. The main areas of application are the furniture and construction industries. Most particleboard is made with urea-formaldehyde resin as a binder and is used for furniture manufacture and interior joinery work. Such material however has limited water resistance, and is not suitable for outdoor use. One further development came with the utilization of phenolic glues for the production of particleboard, which lead to a greatly improved moisture-resistance.

In considering the prior art, it is important to note the types of materials which have been used in the production of these composite products. One such product is typically known in the art as particleboard, and this is a board or other material made by gluing together relatively fine wood particles. Such particleboard typically has a density of 42–45 pounds per cubic foot, is dried to a 6–8 percent moisture content, and has approximately 10 percent resin as the binder. Particleboard is made on hot presses which act to eliminate a substantial amount of moisture, and also to set the binding glue. Another type of prior art product made from fine furnish material is medium density fibreboard, which includes lint-like particles.

Another primary type of prior art product is the type which typically comprises flakeboard or wafer board. About the coarsest size of the flakes would have a thickness from 0.005 inches to 0.015 inches. These flakes or wafers are carefully prepared to this range of thicknesses, and the resultant flakeboard is relatively dense as a result. This material includes products also referred to as wafer board, strand board, or oriented strand board. The fourth major category of prior art material is plywood.

As a means of comparison, the particleboard and flakeboard are prepared in a comparable fashion in that a mat of loose particles and binder is compressed into the final board form. In the case of particleboard, an initial matting of approximately four inches is compressed to a three-quarter inch thickness, a ratio of about five or six to one. Flakeboard is typically prepared by compressing a three inch mat of flakes to a thickness of three-quarters of an inch in the final board, a ratio of about four to one. Put in other terms, the particleboard is compressed by about 80 percent, or in other words to a thickness of about 20 percent of its original thickness in the loose mat form, and the flakeboard is compressed by about 75 percent, or to a thickness of about 25 percent of the loose mat form. In contrast, the present invention uses irregularly shaped particles, having a diversity of thicknesses outside of the ranges of either of these prior art products, and the compression is preferably by at most about 65 percent, or to a volume preferably of not less than about 35 percent of the loose mat form.

Certain problems or disadvantages are associated with some of the prior art materials and methods. Of course, the prior art products and methods are well suited for particular applications and will continue to be so. However, these prior art processes can have substantial expenses associated with them which are avoided by the present invention. For example, the preparation of flakeboard involves the use of a flaker which is an expensive piece of equipment requiring a significant amount of maintenance and refurbishing from time to time. Additionally, the prior art methods have typically included equipment necessary to accurately screen and size the particles used in these prior art products, with additional equipment being necessary to handle the product not falling within the size specifications. Further, a greater amount of glue is typically required in the prior art because of the greater surface area needed to be bonded. Further, the density or compactness of these prior art products makes the moisture content more critical because it is less able to escape after production or to be handled during the process of production.

A variety of devices have been proposed and utilized in the prior art for the production of composite materials. In U.S. Pat. No. 3,565,725, issued to Siempelkamp on Feb. 23, 1971, there is disclosed a multi-level press for the production of such materials. According to the Siempelkamp patent, a fiber layer is deposited on a continuous surface and is then stacked and fed in several layers into the multi-level press. A related multi-platen press is disclosed in U.S. Pat. No. 3,050,777 issued to Siempelkamp on Aug. 28, 1962. A press for use in the preparation of pressed board is described in U.S. Pat. No. 3,892,619, issued to Hutz on July 1, 1975. In accordance with the Hutz description, a loosely coherent mat of comminuted material is formed and a lamina is added thereon. This combination is hot pressed between two surfaces. The ultimate product includes successive layers of fine, coarse and fine comminuted materials with the lamina being located on one of the fine material layers. In U.S. Pat. No. 3,482,675, issued to Hutz on Dec. 9, 1969, there is described a twin conveyor system for use in transporting mats of the described type.

Various resin materials have also been proposed in the prior art, and many of these are well understood as useful in the preparation of composite materials of this type. A molding power including 20–30 weight percent of cellulosic filler, aliphatic guanamine- (or melamine-) formaldehyde reaction product acid accelerator and a lubricant is disclosed in U.S. Pat. No. 3,428,585, issued to Schuller on Feb. 18, 1969. In U.S. Pat. No. 3,895,984, issued to Cone et al. on July 22, 1975, there is described a method for continuously applying foamed glue to surfaces of a succession of wood veneers, layering on the veneers, and then pressing them to form a plywood panel.

SUMMARY OF THE INVENTION

In one aspect of the present invention there is provided a method for production of a composite rigid material formed from comminuted particles, the method including blending the comminuted particles and a suitable adhesive, forming the blend into a loosely coherent mass, and compressing the mass by at most about 65 percent along with curing the adhesive to form the rigid material. In related aspects the invention utilizes particular adhesives and particles, particularly a mixture of particles with at least 25 percent having a thickness greater than 2.5 mm and 25 percent having a thickness less than 1.0 mm.

It is an object of the present invention to provide a novel composite rigid material.

It is a further object of the present invention to provide a composite material which has distinctive physical properties.

Another object of the present invention is to provide a composite material which may be made from a variety of wood or other wood-like materials having a diversity of sizes and thicknesses, and particularly having a diversity of origins such as tree limbs and bark.

It is another object of the present invention to provide a composite material and associated method which is less expensive, and particularly which method requires less sophisticated and expensive equipment for performance.

Further objects and advantages of the present invention will become apparent from the description of the preferred embodiment which follows.

DESCRIPTION OF THE PREFERRED EMBODIMENT

For the purposes of promoting an understanding of the principles of the invention, reference will now be made to the preferred embodiment and specific language will be used to describe the same. It will nevertheless be understood that no limitation of the scope of the invention is thereby intended, such alterations and further modifications, and such further applications of the principles of the invention being contemplated as would normally occur to one skilled in the art to which the invention relates.

The present invention provides a composite rigid material formed from comminuted particles, the material having novel physical properties and also being more economical. A method whereby raw material that was formerly unacceptable to the composite material manufacturing can be used to create a composite material that in most cases is either equal to or superior to other composite materials in strength, quality and durability at a much cheaper cost of production. The material of the present invention is what I refer to as Greer chipboard. Particular advantages of the present invention include the unique properties of the material, as well as the fact that the material can be made from a variety of particles which need not be specially prepared and sized, and which are readily available and expensive. The method is particularly advantageous in that it eliminates the need for certain capital equipment involved in other prior art procedures, and also requires fewer steps in performance.

In one aspect of the present invention, there is provided a method for the production of composite rigid material formed from comminuted particles, which method comprises the steps of blending the comminuted particles and a suitable adhesive, forming the blend into a mat and compressing the mat into a rigid material. The step of blending the comminuted particles and adhesive may be performed with a variety of equipment well known in the art. In fact, many of the individual steps utilized in the present invention may be performed with a variety of existing, standard equipment used in the art for making particleboard or flakeboard. Blenders are readily available for metering a predetermined amount of adhesive into the comminuted particles and providing the blend to a forming station.

The comminuted particles and adhesive are combined in the glue blender in the usual fashion. The blender meters the chips onto a scale and also meters the amount of glue or adhesive. Surge bins may be used to accommodate the blended material prior to formation into mats.

As previously indicated, it is a particular aspect of the present invention that the comminuted particles may encompass a wide range of material sizes and types. The particles will typically comprise wood particles such as sawdust, chips, shavings or other byproducts or waste materials from lumbering or sawmilling operations. Typically the prior art requires the use of round wood, or in other words wood which has been debarked and which is larger than the typical waste branches or twigs. The round wood used in the prior art processes is typically required in order to use the flakers, which are large machines which flake the wood to the desired thickness for the prior art processes. Such a flaker device may cost in the range of $500,000, whereas the present invention does not require the precise thicknesses and configurations of the particles and any sizing may be accomplished with a chipping device costing more in the range of $5,000. Virtually any or all of any species of wood may be utilized to make the chipboard of the present invention.

The sizes of the particles for the present invention may vary as desired, and this can be controlled by suitable sizing devices. For example, a three way screening system is preferably used in which the undesirable materials are sorted for burning, the desirable materials are passed onto a dryer, and those particles which are too large are hammer milled to a smaller size and returned to the screening system. The hammer mill is a device well known in the art suitable for this type of procedure. Unlike the prior art, it is not necessary in accordance with the present invention to air classify the material since the diversity of material sizes are useful. Additionally, a desired percentage of other materials such as sawdust or logging slash or residue may be added prior to or subsequent to the sizing step.

The present invention is suitable for using the otherwise waste materials, including branches and bark. Of course, the ratio of the various particle sizes may be determined in accordance with the desired properties of the ultimate composite material. As used herein, the term "comminuted particles" is intended to cover a mixture of particles falling within the above description. Further, it is to be understood that the present invention encompasses the use of particles which are either wood products or wood-like materials, which includes other fibrous materials such as cotton stocks, corn stocks or rice husks. Such fibrous materials are useful in the preparation of a composite material by means of the described adhesives, and are therefore contemplated hereby. In a preferred embodiment, the particle mixture includes at least about 25 weight percent of particles having a thickness of at least about 2.5 mm, and at least about 25 weight percent of particles having a thickness of at most about 1.0 mm. Some chips have been observed to have a thickness of at least one-half inch. The maximum thickness of the chip is limited only to the final thickness of the board being produced.

The particles are then passed on to a dryer to reduce the moisture content. The sized chips are moved directly to the dryer for reduction of the moisture content as desired, typically down to about 1-6 percent moisture. Unlike the prior art, the present invention provides a process and product which could withstand higher moisture content for the particles. This is particularly true if a cold setting adhesive was used to bind the materials. Otherwise, the high pressure binding process, typically used in the curing of the glue, creates sufficient steam as to be a problem. However, even the evolution of steam is better handled by the present invention since the composite material has a substantial number of relatively large air spaces through which the steam can escape. Similarly, the moisture content of the final product can tolerably be higher than the prior art particle board and flakeboard materials because the tendency for the material to warp due to presence of moisture is reduced since the moisture can escape through the substantial number of air spaces.

An amount of a suitable adhesive is blended with the particles sufficient to provide binding upon compression of the blend to final form. It will be appreciated that the use of the larger size particles provides a resulting reduction in the amount of surface area for bonding. The percentage of adhesive used in the composite material of the present invention is correspondingly reduced. Typical prior art materials would have a weight percentage of binder in the range of at least about 10 or 12 percent. In contrast, the present invention typically utilizes at most about 6 weight percent of the adhesive or binder, and may include 4 percent or less. A variety of adhesives are well known in the art as being suitable for the use in composite materials formed from wood particles, and a couple of these are described in the prior art cited earlier in this text. The adhesive may preferably be selected from the group consisting of propylmethyldiisocyanate, urea formaldehyde and phenolic formaldehyde based adhesives. These particular adhesives are well known in the art and are available in various forms commercially. The selected adhesive is metered into the particle mix and is blended therewith by means of the blender previously described.

The blended particles and adhesive are then formed into a loosely coherent mass or mat. Again, devices suitable for this process are well known in the art and are readily available from various manufacturers. The mat may have a variety of shapes and sizes, and particularly would desirably have a predetermined thickness depending upon the compression step to follow. In a particular method, a mat of approximately five feet by twenty feet is prepared on a continuous steel band which shifts the mat forward to a press. The mat may have a variety of thicknesses, and typically would have a thickness of about four inches.

The formed mat of particles and adhesive is then delivered to a press for compression of the mass to its final thickness. The construction and design of the forming and delivery components are also well known in the art and examples are described in the cited patents. Descriptions of these and the other components useful in accordance with the present invention are hereby incorporated by reference from the previously cited patents. The mat may typically be moved to the press by means of rollers. A multi-platen press may be used, in which case a delivery means is provided for delivering several formed mats to the various platens of the press. In a particular embodiment, a Dieffenbacher, single opening hot press has been used, although single or multiple opening presses are equally suitable as well as a continuous press. A hot press is preferably used to provide for curing of the adhesive at the same time as compression of the mat to its final thickness. In this process, the moisture content of the final composite material is reduced to about 6.0–8.0 percent, although higher percentages could be tolerated if a cold setting glue is used as previously described. An amount of adhesive is used sufficient to provide the desired strength of the final material, and is also proportional to the particle sizes and thus surface areas to be bonded.

In a particular aspect of the present invention, the compression of the mat for bonding is provided to compress the mat by preferably at most about 65 percent of its loose form. In otherwords, the mat is compressed to a thickness which is preferably at least about 35 percent of its original thickness. The adhesive is cured with the mass in the compressed state to form a substantially rigid composite material. In a further aspect, the mass is compressed by at most about 50 percent, or in other words to a thickness of at least about 50 percent of its loose form. In a related aspect, the mass is compressed to have a void volume of at least about 10 percent, the void volume being the volume of voids or open areas as a percentage of the volume occupied by the composite material, and certain embodiments to at least about 20 percent. Further, in one aspect the method comprises compressing the mass to a density of at highest about 35 pounds per cubic foot, and in another aspect includes compressing the mass to a density of greater than 45 pounds per cubic foot.

As described, the method of the present invention provides a unique composite material having desirable economics and physical properties. The material can be engineered to be used to replace solid wood for nearly all components used in home construction such as sheeting, boxing, flooring, studing, floor joist, ceiling joist, rafters, etc. The material has a variety of uses, which may depend upon the parameters chosen for the sizes of the particles, amount and nature of adhesive, and the like. The material could be used for these and other purposes in the construction industry, particularly upon use of exterior glue. The material also serves as a simple vehicle for transporting chips or other materials to processing points, such as a paper mill. The material is useful as blocking for supporting various cargo such as steel on a flatbed truck, or simply could be used as a fire log. A veneer of thinner or smaller flakes or particles could be applied to the material in standard fashion to provide a decorative surface. The material may be cut to various lengths and widths depending upon the intended use, and in this fashion could be provided with a decorative surface for use. The material also has desirable insulation properties when used in the described or other manners. In addition, the particles could be oriented in order to achieve different physical properties.

While the invention has been described in detail in the foregoing description, the same is to be considered as descriptive and not restrictive in character, it being understood that only the preferred embodiment has been described and that all changes and modifications that come within the spirit of the invention are desired to be protected.

What is claimed is:

1. A method for the production of a composite rigid article formed from irregularly shaped particles of comminuted wood and wood-like materials, encompassing a wide range of material sizes, thicknesses and types, comprising:

a. blending an amount of said wood particles and a sufficient amount of suitable, curable adhesive to form a uniform mixture,
b. forming said mixture into a loosely assembled mat,
c. compressing said mat to a volume not less than about 35% of the original volume of said mat, and
d. curing said adhesive to bond the wood particles into said composite rigid article.

2. The method of claim 1 in which step c. comprises compressing the mat to a volume not less than about fifty percent of the original volume of the mat.

3. The method of claim 1 in which step c. comprises compressing the mat to a density of at highest about 35 pounds per cubic foot.

4. The method of claim 1 in which step c. comprises compressing the mat to have a void volume of at least about ten percent.

5. The method of claim 1 in which the adhesive of step a. is selected from the group consisting of propylmethyldiisocyanate, urea formaldehyde and phenolic formaldehyde based adhesives.

6. The method of claim 1 in which step a. comprises blending the comminuted wood particles with at most about six weight percent of the adhesive.

7. The method of claim 1 and which further includes, prior to step a., the steps of sizing the comminuted particles to have at least about 25 weight percent of particles having a thickness of at least about 2.5 mm and drying the comminuted particles.

8. The method of claim 7 in which step c. comprises compressing the mat to have a void volume of at least about ten percent.

9. The method of claim 7 in which said drying is to dry the particles to a moisture content by weight of from about one percent to about six percent.

10. The method of claim 7 in which said sizing is also to provide at least about 25 weight percent of particles having a thickness of at most about 1.0 mm.

11. The method of claim 10 in which step c. comprises compressing the mat to a volume not less than about fifty percent of the original volume of the mat.

12. The method of claim 11 in which step a. comprises blending the comminuted wood particles with at most about three weight percent of the adhesive.

13. A method for the production of a composite rigid article formed from irregularly shaped particles of comminuted wood and wood-like materials, encompassing a wide range of material sizes, thicknesses and types, comprising:
a. blending an amount of said wood particles and a sufficient amount of suitable, curable adhesive to form a uniform mixture, wherein at least 25% of the wood particles have a thickness of at least about 2.5 mm,
b. forming said mixture into a loosely assembled mat,
c. compressing said mat to a volume not less than about 35% of the original volume of said mat, and
d. curing said adhesive to bond the wood particles into said composite rigid article.

14. The method of claim 13 in which step c. comprises compressing the mat to have a void volume of at least about ten percent.

15. The method of claim 13 in which step c. comprises compressing the mat to a density of at highest about 35 pounds per cubic foot.

16. The method of claim 13 in which step c. comprises compressing the mat to a volume not less than about fifty percent of the original volume of the mat.

17. The method of claim 13 in which the comminuted wood particles further include at least about 25 weight percent of particles having a thickness of at most about 1.0 mm.

18. The method of claim 17 in which step c. comprises compressing the mat to have a void volume of at least about ten percent.

19. The method of claim 18 in which step c. comprises compressing the mat to a density of at highest about 35 pounds per cubic foot.

* * * * *